United States Patent
Krishnamurthy

(10) Patent No.: US 11,030,479 B2
(45) Date of Patent: Jun. 8, 2021

(54) MAPPING VISUAL TAGS TO SOUND TAGS USING TEXT SIMILARITY

(71) Applicant: Sony Interactive Entertainment Inc., Tokyo (JP)

(72) Inventor: Sudha Krishnamurthy, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 121 days.

(21) Appl. No.: 16/399,640

(22) Filed: Apr. 30, 2019

(65) Prior Publication Data
US 2020/0349387 A1 Nov. 5, 2020

(51) Int. Cl.
G06K 9/62 (2006.01)
G06F 16/75 (2019.01)
G06F 16/783 (2019.01)
G06N 3/08 (2006.01)
G06N 20/10 (2019.01)

(52) U.S. Cl.
CPC .......... G06K 9/6215 (2013.01); G06F 16/75 (2019.01); G06F 16/7834 (2019.01); G06F 16/7837 (2019.01); G06F 16/7844 (2019.01); G06K 9/6271 (2013.01); G06N 3/08 (2013.01); G06N 20/10 (2019.01)

(58) Field of Classification Search
CPC ............. G06K 9/6215; G06K 9/00624; G06F 16/7844; G06F 16/75; G06F 16/7837; G06F 16/7834; G06F 16/40; G06F 16/433; G06F 16/70; G06F 16/60; G06N 3/08; G06N 20/10; G10L 15/24; G10L 25/51
See application file for complete search history.

(56) References Cited

U.S. PATENT DOCUMENTS 9,384,214 B2 * 7/2016 Slaney .................... G06F 16/58
9,827,496 B1 * 11/2017 Zinno ...................... A63F 13/53
9,961,403 B2 * 5/2018 Kritt ..................... H04N 21/266
2006/0277454 A1 * 12/2006 Chen .................... G06F 16/4393
  715/203
2011/0029873 A1 * 2/2011 Eseanu ............... G06F 3/04842
  715/719
2011/0075851 A1 * 3/2011 LeBoeuf ................ H04R 29/00
  381/56
2011/0173235 A1 * 7/2011 Aman ................. G06K 9/00342
  707/792

(Continued)

OTHER PUBLICATIONS

International Search Report and Written Opinion from the counterpart PCT application PCT/US20/28143 dated Jul. 23, 2020.

(Continued)

Primary Examiner — Asghar H Bilgrami
(74) Attorney, Agent, or Firm — John L. Rogitz

(57) ABSTRACT

Sound effects (SFX) are registered in a database for efficient search and retrieval. This may be accomplished by classifying SFX and using a machine learning engine to output a first of the classified SFX for a first computer simulation based on learned correlations between video attributes of the first computer simulation and the classified SFX. Subsequently, videos without sound may be processed for object, action, and caption recognition to generate video tags which are semantically matched with SFX tags to associate SFX with the video.

20 Claims, 11 Drawing Sheets

(56) References Cited

U.S. PATENT DOCUMENTS

| | | | |
|---|---|---|---|
| 2013/0073960 A1* | 3/2013 | Eppolito | G11B 27/034 |
| | | | 715/716 |
| 2015/0234833 A1* | 8/2015 | Cremer | G06F 16/50 |
| | | | 707/626 |
| 2016/0203827 A1* | 7/2016 | Leff | G06T 13/40 |
| | | | 704/207 |
| 2017/0228599 A1 | 8/2017 | Juan | |
| 2018/0102143 A1 | 4/2018 | Allison et al. | |
| 2018/0226063 A1* | 8/2018 | Wood | G10H 1/368 |
| 2019/0005128 A1 | 1/2019 | Barari et al. | |
| 2019/0104259 A1* | 4/2019 | Angquist | G11B 27/036 |
| 2020/0167984 A1* | 5/2020 | Cappello | G06T 7/75 |

OTHER PUBLICATIONS

Sudha Krishnamurthy, Xiaoyu Liu, "Video Tagging by Correlating Visual Features to Sound Tags", file history of related U.S. Appl. No. 16/399,505, filed Apr. 30, 2019.

Krishnamurthy et al., "Video Tagging by Correlating Visual Features to Sound Tags", related U.S. Appl. No. 16/399,505, Non-Final Office Action dated Jan. 8, 2020.

Krishnamurthy et al., "Video Tagging by Correlating Visual Features to Sound Tags", related U.S. Appl. No. 16/399,505, Applicant's response to Non-Final Office Action filed Mar. 31, 2020.

\* cited by examiner

MAPPING VISUAL TAGS TO SOUND TAGS USING TEXT SIMILARITY

FIELD

The application relates generally to technically inventive, non-routine solutions that are necessarily rooted in computer technology and that produce concrete technical improvements.

BACKGROUND

Machine learning, sometimes referred to as deep learning, can be used for a variety of useful applications related to data understanding, detection, and/or classification. In computer simulation industries such as gaming industries, video and audio are two separate processes. Simulations are first designed and produced without audio, and then audio groups investigate the simulation videos and insert the corresponding sound effects (SFX) from the SFX database, which is time-consuming.

SUMMARY

As understood herein, machine learning may be used to address the technical problem noted above by providing SFX recommendations that are relevant to computer simulation scenes.

Accordingly, an apparatus includes at least one processor and at least one computer storage that is not a transitory signal and that includes instructions executable by the processor to classify sound effects (SFX) to render classified SFX. The instructions also are executable to semantically match SFX labels of the classified SFX with visual labels derived from video recognition of attributes in at least a first video to incorporate, into the first video, classified SFX associated with the SFX labels.

In some embodiments, the instructions may be executable to generate the visual labels based on recognition of at least one object in the first video, and/or based on recognition of at least one action in the first video, and/or based on recognition of at least one caption in the first video.

In example implementations, the instructions may be executable to semantically match SFX labels with visual labels using text similarity between the SFX labels and visual labels.

In some embodiments, the instructions are executable to derive a first numerical vector corresponding to the visual labels, derive a second numerical vector corresponding to the SFX labels, and determine a similarity of the SFX labels to the visual labels at least in part by computing a distance between the first and second vectors. In such embodiments, the instructions may be executable to determine that a first SFX label is more similar to a visual label than is a second SFX label responsive to a determination that a distance between the first vector and a second vector associated with the first SFX label is smaller than distance between the first vector and a second vector associated with the second SFX label.

If desired, the instructions may be executable to map a single visual label to plural SFX labels.

In another aspect, a method includes generating at least one visual tag describing at least one attribute of at least a first video and associating with the first video at least one sound effect (SFX) associated with at least one SFX tag at least in part based on a semantic similarity between the visual tag and the SFX tag.

In another aspect, an assembly includes at least one computer storage that is not a transitory signal and that in turn includes instructions executable by at least one processor for identifying at least one visual tag describing at least a first video. The instructions also are executable for associating with the first video at least one sound effect (SFX) associated with at least one SFX tag at least in part based on a similarity between the visual tag and the SFX tag.

The details of the present application, both as to its structure and operation, can best be understood in reference to the accompanying drawings, in which like reference numerals refer to like parts, and in which:

DETAILED DESCRIPTION

Figure 1:
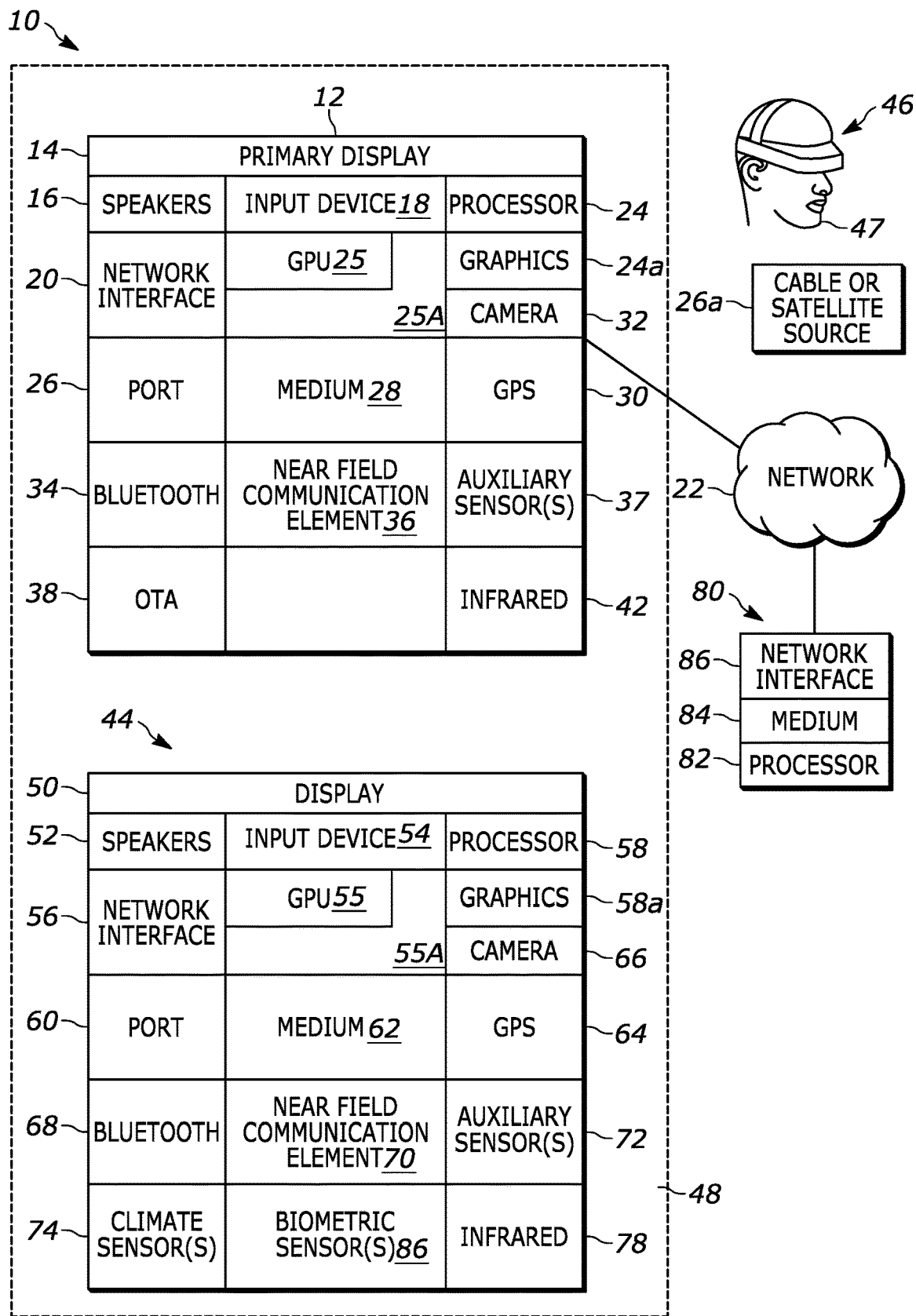
FIG. 1 is a block diagram of an example system consistent with present principles.

In accordance with present principles, deep learning-based domain adaptation methods may be used to recommend SFX for videos and computer simulations such as video games.

The methods described herein may concern multiple objects and multiple actions associated with the multiple objects. For example, an image text-block of many texts may be an "object", and the type of the image block may be an "action".

This disclosure also relates generally to computer ecosystems including aspects of consumer electronics (CE) device networks such as but not limited to distributed computer game networks, augmented reality (AR) networks, virtual reality (VR) networks, video broadcasting, content delivery networks, virtual machines, and artificial neural networks and machine learning applications.

A system herein may include server and client components, connected over a network such that data may be exchanged between the client and server components. The client components may include one or more computing devices including AR headsets, VR headsets, game consoles such as Sony PlayStation® and related motherboards, game controllers, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple, Inc. or Google. These operating environments may be used to execute one or more programs/applications, such as a browser made by Microsoft or Google or Mozilla or other browser program that can access websites hosted by the Internet servers discussed below. Also, an operating environment according to present principles may be used to execute one or more computer game programs/applications and other programs/applications that undertake present principles.

Servers and/or gateways may include one or more processors executing instructions that configure the servers to receive and transmit data over a network such as the Internet. Additionally, or alternatively, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or video game website to network users to communicate crowdsourced in accordance with present principles.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

As indicated above, present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below may be implemented in hardware circuitry or software circuitry. When implemented in software, the functions and methods can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, an augmented reality (AR) headset, a virtual reality (VR) headset, Internet-enabled or "smart" glasses, another type of wearable computerized device such as a computerized Internet-enabled watch, a computerized Internet-enabled bracelet, a computerized Internet-enabled music player, computerized Internet-enabled head phones, a computerized Internet-enabled implantable device such as an implantable skin device, other computerized Internet-enabled devices, etc. Regardless, it is to be understood that the AVD 12 is configured to undertake present principles (e.g., communicate with other consumer electronics (CE) devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors. Thus, the interface 20 may be, without limitation, a Wi-Fi transceiver, which is an example of a wireless computer network interface, such as but not limited to a mesh network transceiver. Furthermore, note the network interface 20 may be, e.g., a wired or wireless modem or router, or other appropriate interface such as, for example, a wireless telephony transceiver, or Wi-Fi transceiver as mentioned above, etc.

It is to be understood that the one or more processors control the AVD 12 to undertake present principles, including the other elements of the AVD 12 described herein such as controlling the display 14 to present images thereon and receiving input therefrom. The one or more processors may include a central processing unit (CPU) 24 as well as a graphics processing unit (GPU) 25 on a graphics card 25A.

In addition to the foregoing, the AVD 12 may also include one or more input ports 26 such as, e.g., a high definition multimedia interface (HDMI) port or a USB port to physically connect (e.g., using a wired connection) to another consumer electronics (CE) device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes. The source 26a when implemented as a game console may include some or all of the components described below in relation to the CE device 44 and may implement some or all of the logic described herein.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to, e.g., receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to, for example, determine the location of the AVD 12 in all three dimensions.

Continuing the description of the AVD 12, in some embodiments the AVD 12 may include one or more cameras 32 that may be, e.g., a thermal imaging camera, a digital camera such as a webcam, an infrared (IR) camera, and/or a camera integrated into the AVD 12 and controllable by the processor 24 to generate pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other consumer electronics (CE) device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as an AR or VR headset worn by a user 47 as shown. In the example shown, only two CE devices 44, 46 are shown, it being understood that fewer or greater devices may also be used in accordance with present principles.

In the example shown, all three devices 12, 44, 46 are assumed to be members of a network such as a secured or encrypted network, an entertainment network or Wi-Fi in, e.g., a home, or at least to be present in proximity to each other in a certain location and able to communicate with each other and with a server as described herein. However, present principles are not limited to a particular location or network unless explicitly claimed otherwise.

The example non-limiting first CE device 44 may be established by any one of the above-mentioned devices, for example, a smart phone, a digital assistant, a portable wireless laptop computer or notebook computer or game controller (also referred to as "console"), and accordingly may have one or more of the components described below. The second CE device 46 without limitation may be established by an AR headset, a VR headset, "smart" Internet-enabled glasses, or even a video disk player such as a Blu-ray player, a game console, and the like. Still further, in some embodiments the first CE device 44 may be a remote control (RC) for, e.g., issuing AV play and pause commands to the AVD 12, or it may be a more sophisticated device such as a tablet computer, a game controller communicating via wired or wireless link with a game console implemented by another one of the devices shown in FIG. 1 and controlling video game presentation on the AVD 12, a personal computer, a wireless telephone, etc.

Accordingly, the first CE device 44 may include one or more displays 50 that may be touch-enabled for receiving user input signals via touches on the display 50. Additionally, or alternatively, the display(s) 50 may be an at least partially transparent display such as an AR headset display or a "smart" glasses display or "heads up" display, as well as a VR headset display, or other display configured for presenting AR and/or VR images.

The first CE device 44 may also include one or more speakers 52 for outputting audio in accordance with present principles, and at least one additional input device 54 such as, for example, an audio receiver/microphone for entering audible commands to the first CE device 44 to control the device 44. The example first CE device 44 may further include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as, e.g., controlling the display 50 to present images thereon and receiving input therefrom. Furthermore, note that the network interface 56 may be, for example, a wired or wireless modem or router, or other appropriate interface such as a wireless telephony transceiver, or Wi-Fi transceiver as mentioned above, etc.

Still further, note that in addition to the processor(s) 58, the first CE device 44 may also include a graphics processing unit (GPU) 55 on a graphics card 55A. The graphics processing unit 55 may be configured for, among other things, presenting AR and/or VR images on the display 50.

In addition to the foregoing, the first CE device 44 may also include one or more input ports 60 such as, e.g., a HDMI port or a USB port to physically connect (e.g., using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to, e.g., receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to, e.g., determine the location of the first CE device 44 in all three dimensions.

Continuing the description of the first CE device 44, in some embodiments the first CE device 44 may include one or more cameras 66 that may be, e.g., a thermal imaging camera, an IR camera, a digital camera such as a webcam, and/or another type of camera integrated into the first CE device 44 and controllable by the CE device processor 58 to generate pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g., for sensing gesture command), etc.) providing input to the CE device processor 58. The first CE device 44 may include still other sensors such as, for example, one or more climate sensors 74 (e.g., barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage. In an implementation, the medium 84 includes one or more solid state storage drives (SSDs). The server also includes at least one network interface 86 that allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as a wireless telephony transceiver. The network interface 86 may be a remote direct memory access (RDMA) interface that directly connects the medium 84 to a network such as a so-called "fabric" without passing through the server processor 82. The network may include an Ethernet network and/or fiber channel network and/or InfiniBand network. Typically, the server 80 includes multiple processors in multiple computers referred to as "blades" that may be arranged in a physical server "stack".

Accordingly, in some embodiments the server 80 may be an Internet server or an entire "server farm", and may include and perform "cloud" functions such that the devices of the system 10 may access a "cloud" environment via the server 80 in example embodiments for, e.g., domain adaptation as disclosed herein. Additionally, or alternatively, the server 80 may be implemented by one or more game consoles or other computers in the same room as the other devices shown in FIG. 1 or nearby.

Figure 2:
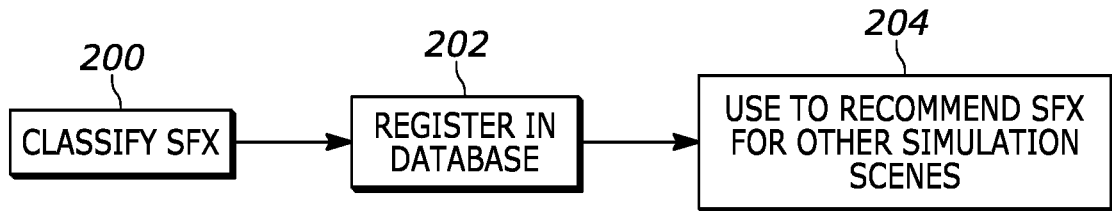
FIG. 2 is a flow chart of example overall logic for recommending sound effects (SFX) for a video or computer simulation consistent with present principles.
Figure 3:
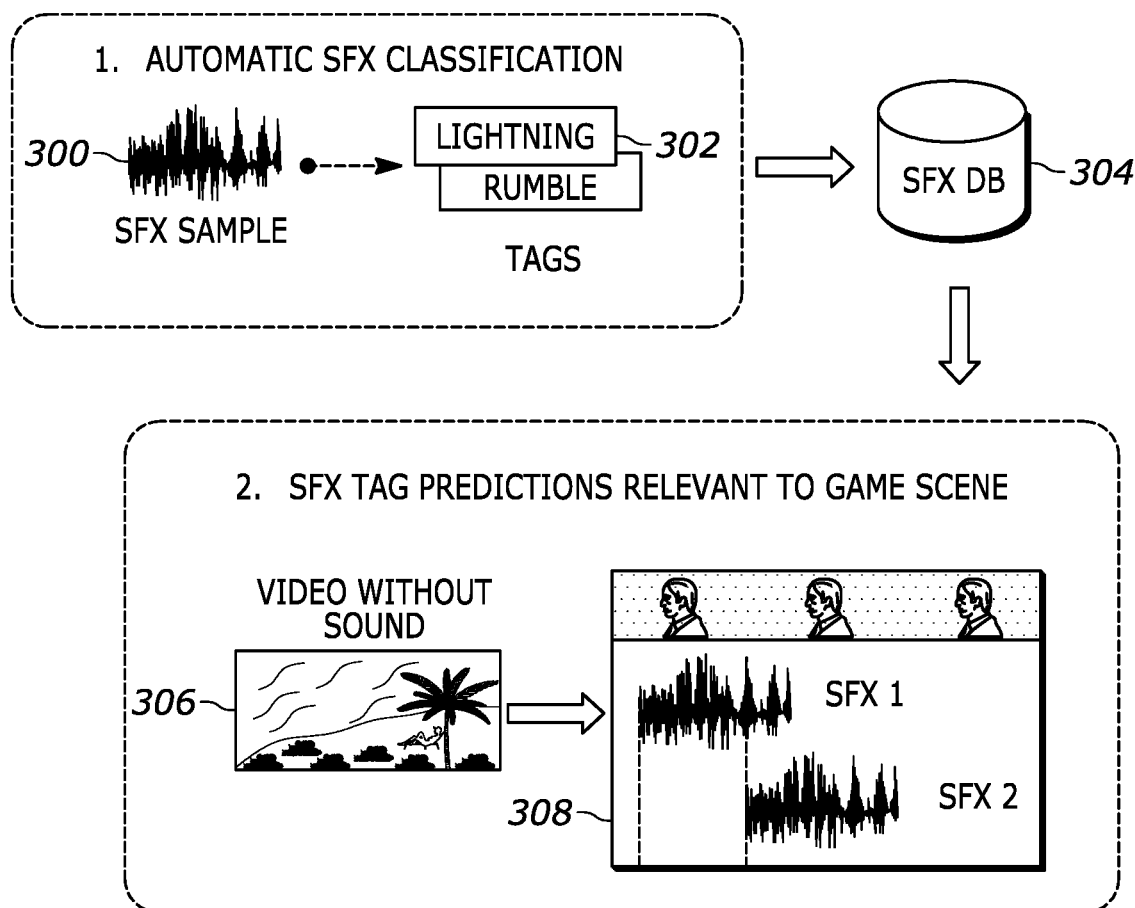
FIG. 3 is a block diagram illustrating the logic of FIG. 2.

FIGS. 2 and 3 illustrate overall principles. Commencing at block 200 in FIG. 2, sound effects (SFX) are classified. In an example, this classification may be executed on incoming digitized sound effect signals 300 to render tags 302 (graphically shown in FIG. 3) that describe in words the sound effects being classified as set forth elsewhere herein.

Moving to block 202 in FIG. 2 and still cross-referencing FIG. 3, the tags 302 are registered in a database 304. Then, proceeding to block 204 in FIG. 2, the registered tags may be combined with video without sound 306 to render video with sound effect sound 308. Note that "sound effects" refer to non-verbal audio that is part of computer simulations such as computer games to mimic the sounds of gunfire, fire burning, people running, people yelling exclamations, water, etc. As set forth further below, deep learning/AI techniques are provided herein to assist in sound content creation for computer simulations such as video games.

As used herein, "clean SFX tagging" refers to classifying or tagging clean audio samples (sound effects with a single source of sound) used by game sound designers based on their categories and subcategories, so that they can be registered in a database automatically. This assists the game designers by making search and retrieval during sound mixing more efficient. "Video tagging" refers to recommending sound effects that are relevant to a game scene automatically. This is done to assist game designers by making the sound design process more efficient. Present principles focus on techniques to achieve video tagging.

Figure 10:
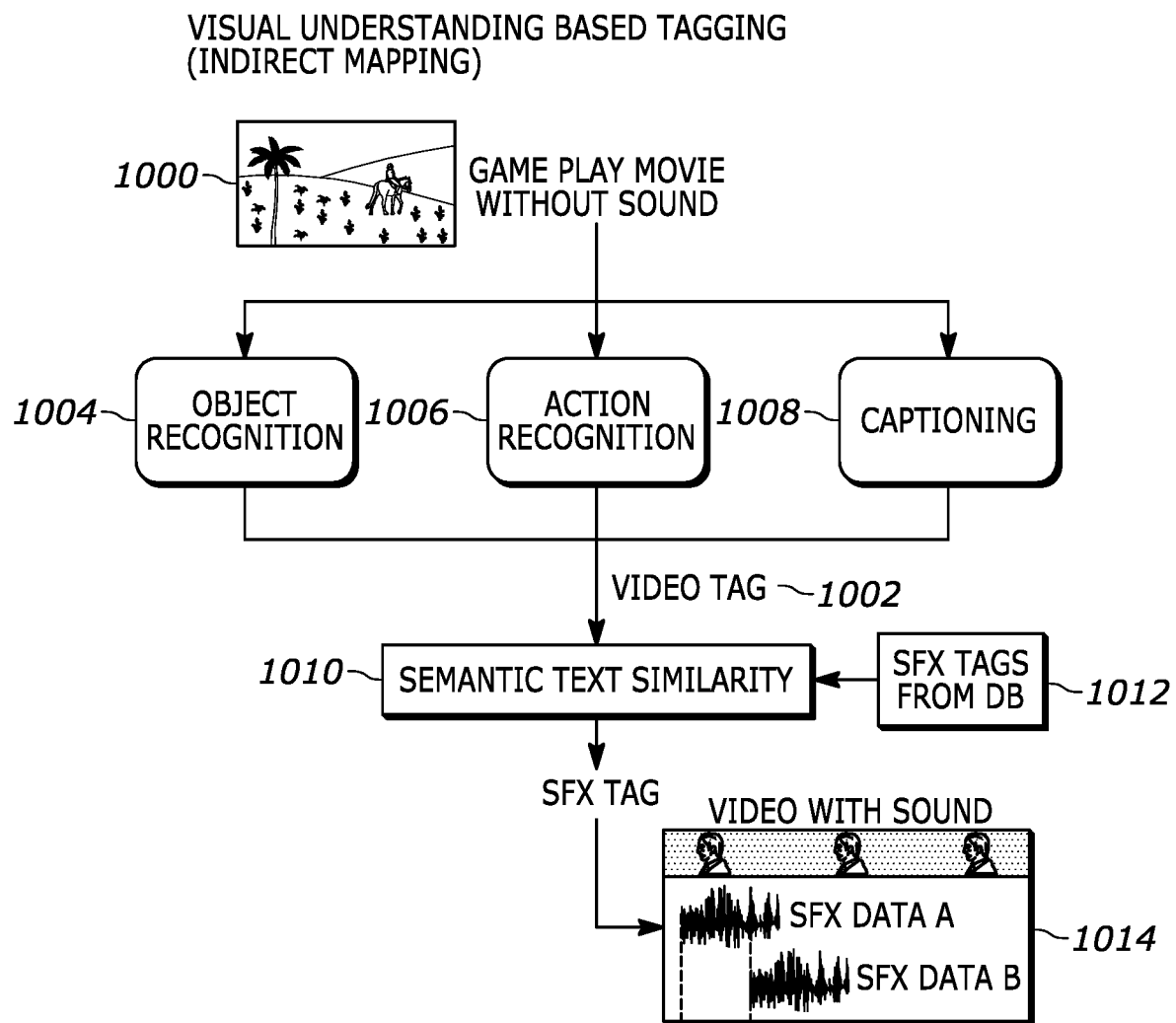
FIG. 10 is a block diagram of features of a second approach for video tagging involving indirect tagging by visual understanding.
Figure 11:
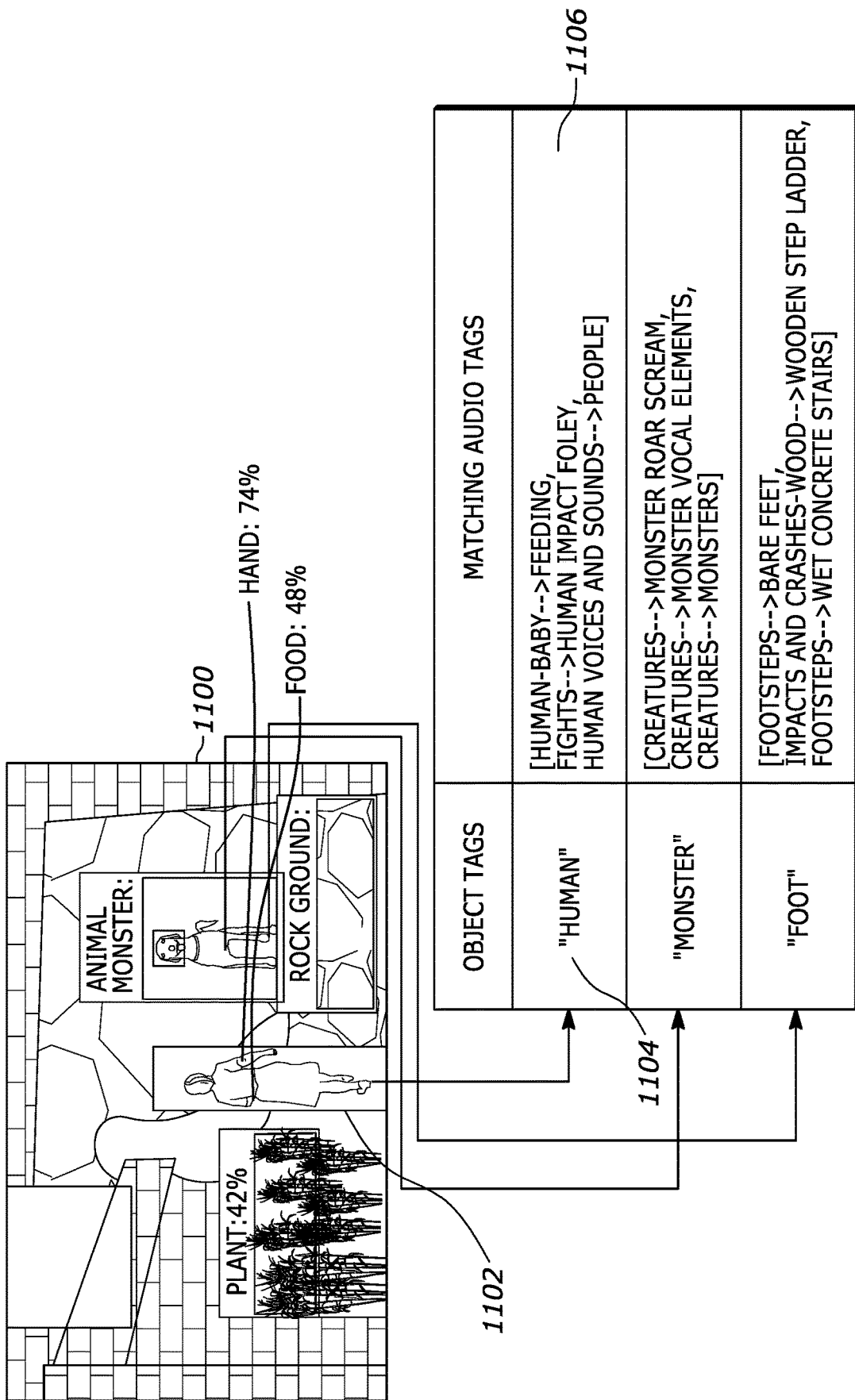
FIGS. 11 and 12 are screen shots and related tables illustrating correlating visual tags with matching SFX audio tags.
Figure 12:
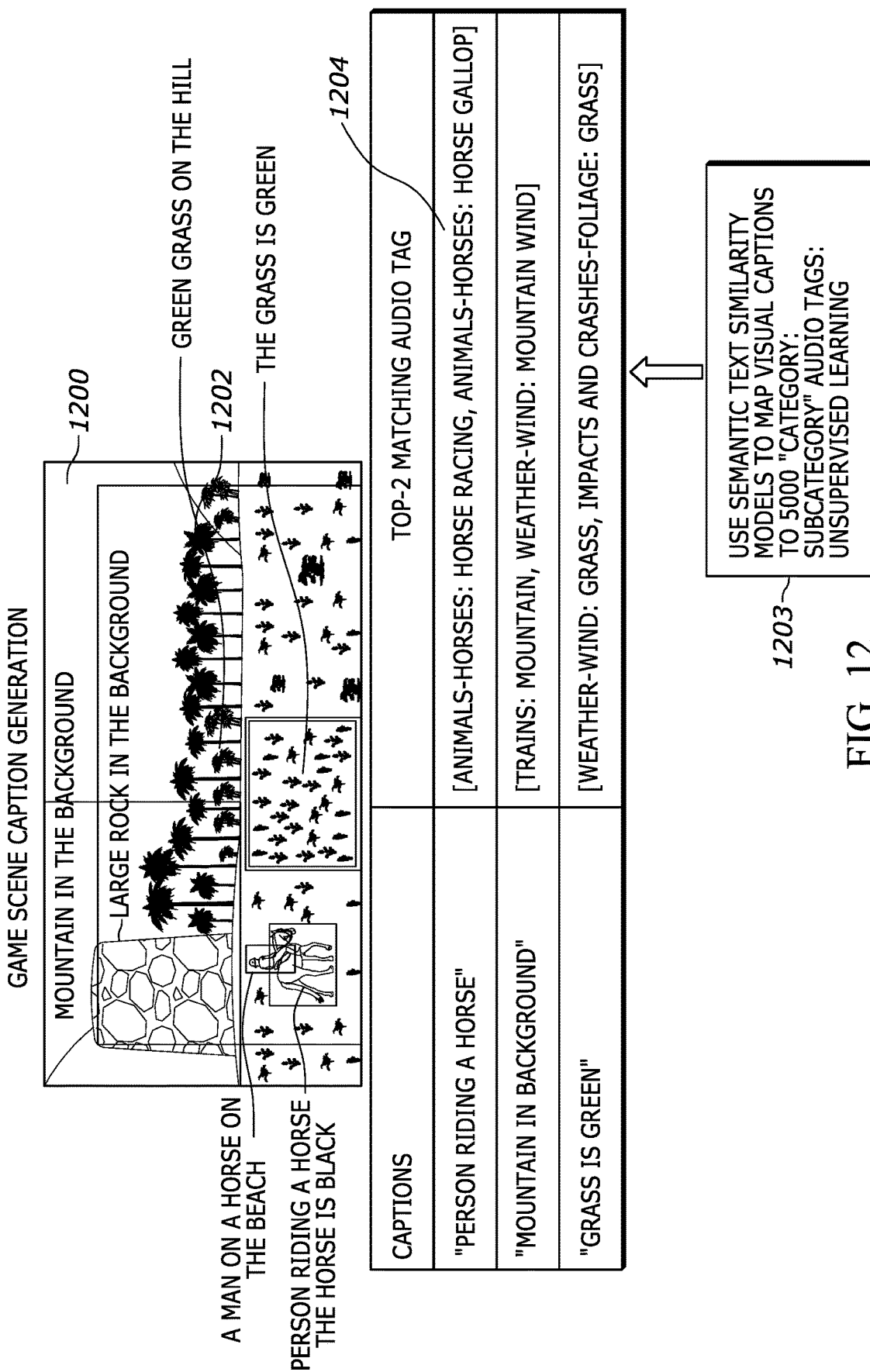

This disclosure divulges two techniques for video tagging. FIGS. 4-9 describe a direct mapping approach in which a deep learning engine is trained to learn a correlation between the visual features of a game video and corresponding SFX (audio) tags 302. FIGS. 10-12 describe a visual understanding approach in two steps, namely, providing a neural network (NN) to understand the visual content of the game scene and generate visual tags, which includes object tags, action tags, and captions, followed by mapping the visual tags to audio tags using semantic text similarity. Dictionary-based mapping may also be used based on other knowledge bases.

Figure 4:
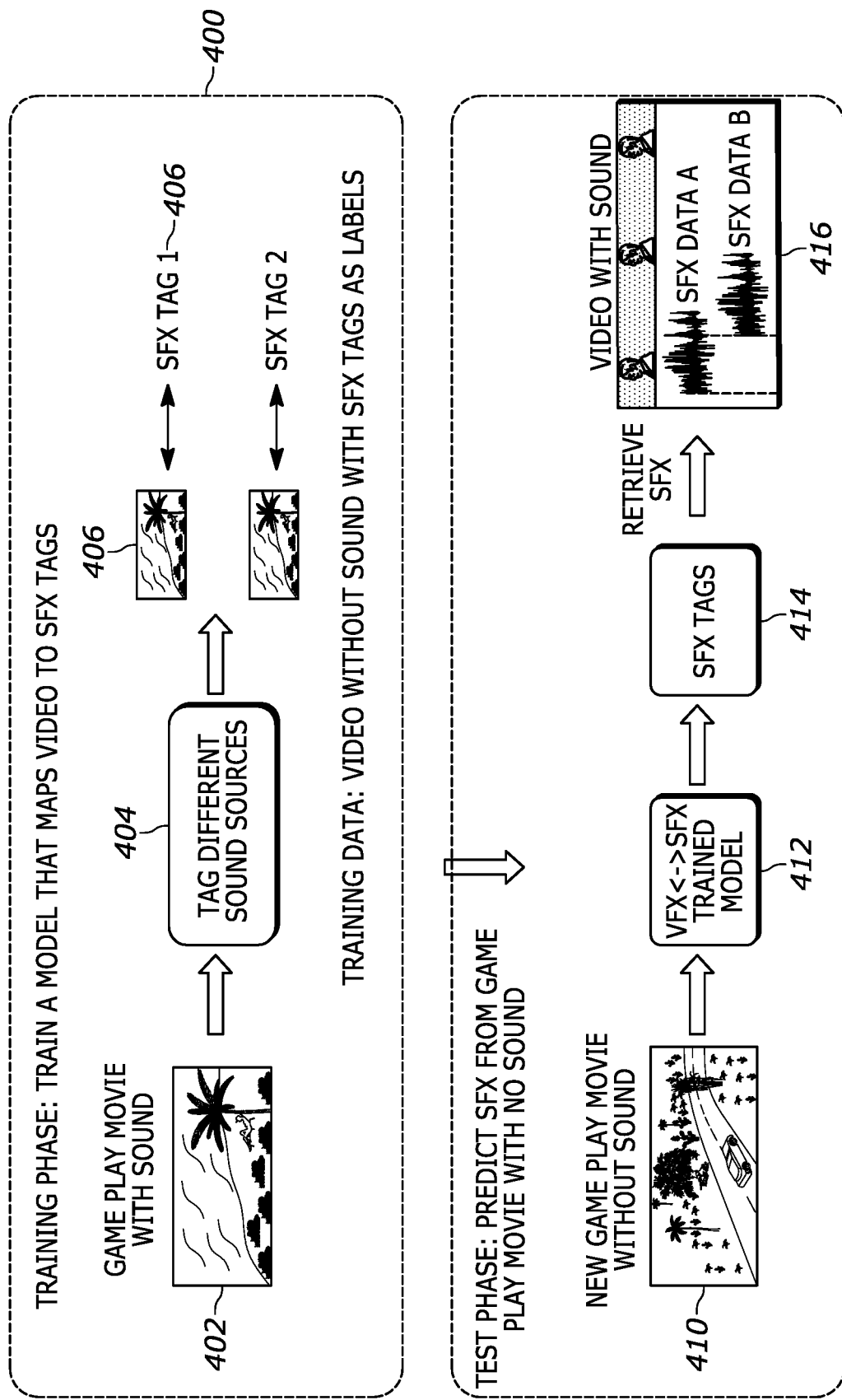
FIG. 4 is a block diagram of a first approach for SFX tagging involving direct mapping from video to SFX tags.

Accordingly, and now referring to FIG. 4, in a training phase 400 video such as computer simulations with SFX sounds 402 are used to train a NN system to generate tags 404 for different SFX sources to render SFX tags 406. Once the NN system is trained, it may be used in a test phase 408 to receive video 410 such as computer simulations without SFX sounds as input to a trained model 412 described further below to output SFX tags 414 that are combined with the video 410 to render video 416 with SFX sound incorporated therein.

Figure 5:
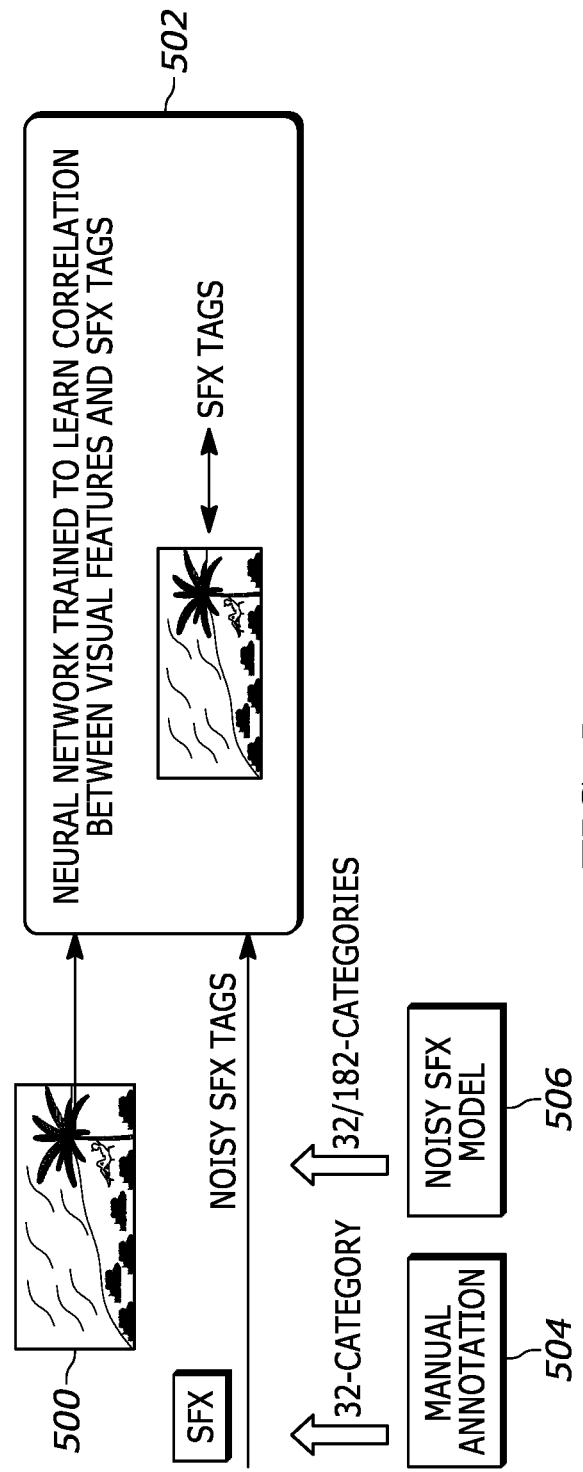
FIG. 5 is a block diagram of additional features consistent with the first approach in FIG. 4.

Now referring to FIG. 5, a more detailed explanation of the training phase from FIG. 4 may be seen. Silent video such as computer game video 500 is input to a trained NN 502. A supervised learning approach is used by the NN 502 for learning a direct mapping between visual features of a video and corresponding sound effects. To train this supervised model, sound annotations for the game audio are required. As understood herein, the process is complicated by the fact that game audio typically contains a mixture of sounds (also referred to as noisy SFX), making it difficult to obtain human annotations 504, especially if number of sound categories is large. Hence, a deep learning model 506 is trained to automatically tag a mixture of sounds (noisy SFX model) to identify the categories of the constituent sounds.

Figure 6:
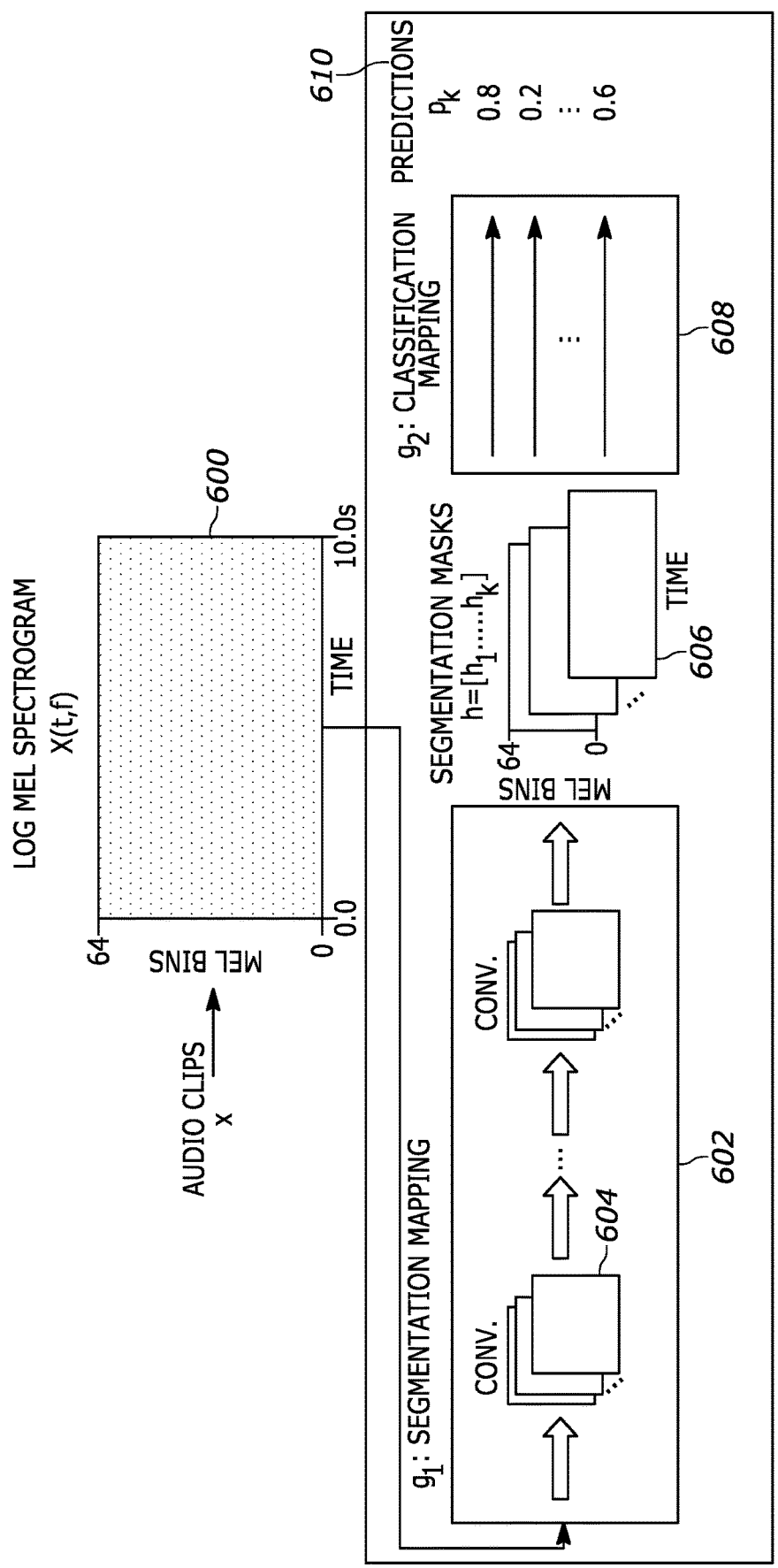
FIGS. 6 and 7 are block diagrams of machine learning architectures related to "noisy" coarse-grained (in the example shown, 32-category) SFX classification consistent with the first approach in FIG. 4.
Figure 7:
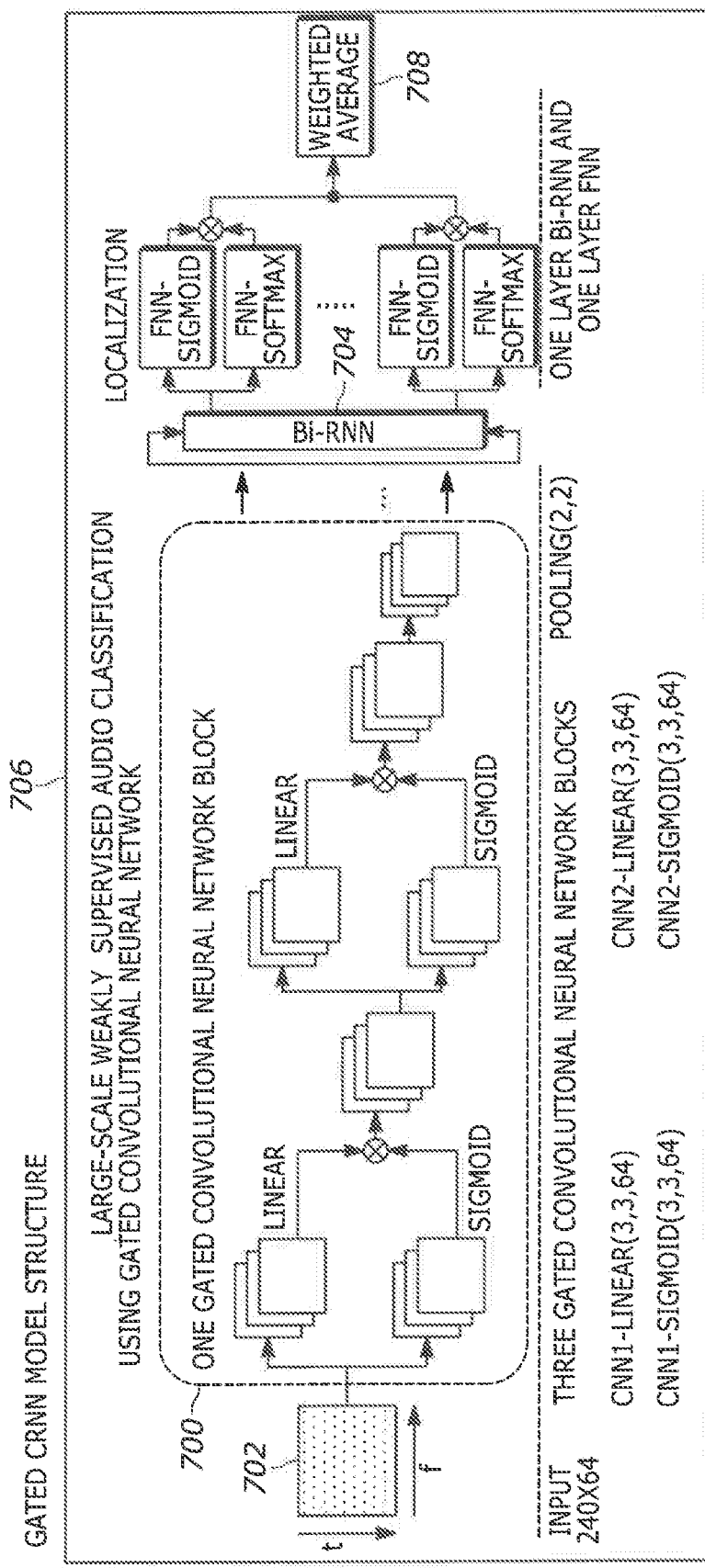

Now referring to FIGS. 6 and 7, in an initial embodiment a noisy SFX model is trained to tag a small number of categories (32 classes) using human annotations. An audio clip represented by the spectrogram 600 is input to a segmentation mapping module 602 that includes a series of convolutional NNs (CNNs) 604. Segmentation masks 606 are output by the mapping module 602 and used for classification mapping 608 that produces predictions 610 for tags with corresponding probabilities. FIG. 7 relatedly shows a gated convolutional recurrent NN (CRNN) 700 that receives SFX clips 702 as input and extracts spectral patterns at each time step, providing output to a bidirectional RNN 704 such as a bidirectional long short-term memory (LSTM). FIG. 7 indicates the types of CNNs used in the network 700. The Bi-RNN 704 is coupled to an attention-based localization module 706 that includes plural feed forward NNs (FNN) operating as sigmoid and SoftMax FNN as shown to produce predicted tags 708 as weighted averages.

Figure 8:
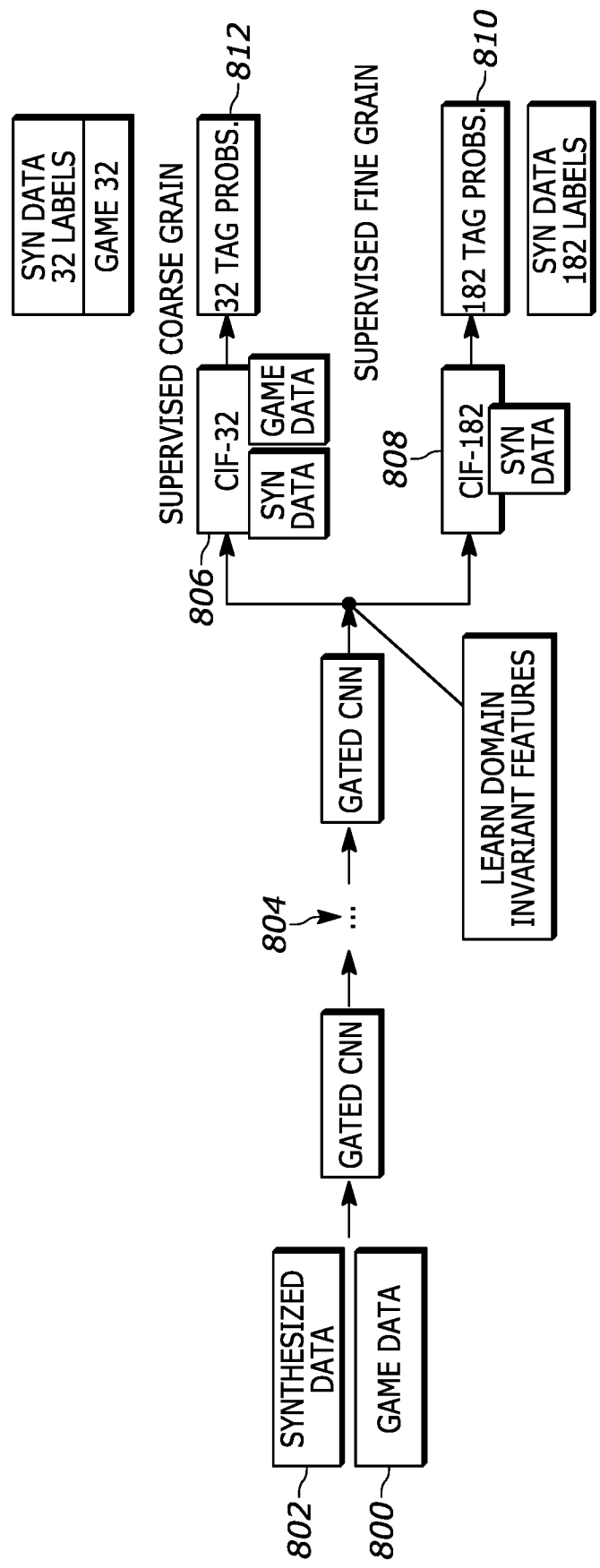
FIG. 8 is a block diagram of a semi-supervised machine learning architecture related to "noisy" fine grain SFX classification consistent with the first approach in FIG. 4.

Of importance to present principles is FIG. 8, illustrating an advanced technique for noisy SFX tagging. To generate finer-grained SFX tags (e.g., 182-class or 5000-class labels or even more detailed) for better discrimination of different sound effects in a noisy sample, a supervised model is trained using actual SFX data 800 from computer simulations and synthesized noisy SFX data 802 generated separately from any simulation solely for purposes of training a gated CNN module 804. In other words, present principles as reflected in FIG. 8 recognize that to train a supervised model, training data is required that has finer-grained (e.g., 182-class or 5000 class) ground truth tags, whereas only coarser-grained (32-class) human annotated SFX labels for game audio currently is available. Hence, FIG. 8 and following figures illustrate a semi-supervised approach that generates fine-grained audio tags from coarse-grained audio tags without additional human annotations. Note that 32-class and 182-class are used as examples of coarse and finer-grained tags.

The synthetic mixtures of sound samples represented at 802 are created and their categories recorded during mixing. In this synthetic mixture, fine-grained SFX labels (referred to elsewhere herein as Dataset1) are established. Block 800, on the other hand, represents the available real game audio with coarse-grained labels (generated by humans) referred to as Dataset2. As shown in FIG. 8, Dataset1 of actual simulation or game data and Dataset2 of synthesized data that is not from a simulation or game but is created for purposes of supplementing game data are combined to train an end-to-end semi-supervised model 804 that includes a coarse classifier 806 and a fine-grained classifier 808 to generate fine-grained tags 810 that identify the components of noisy game audio. It is semi-supervised because no true fine-grained game audio labels are present for training, as explained earlier. It is a multi-tasking model because it is capable of generating both coarse-grained audio tags 812 and fine-grained audio tags 810. In other words, fine grain analysis uses more categories than coarse grain analysis.

The training loss function for this model is a sum of the loss for fine-grained tagging and coarse-grained tagging. The goal of the training is to minimize the training loss. The training stops when the model converges. At this point a model is attained that can decompose a noisy audio mixture into its constituent tags.

Figure 9:
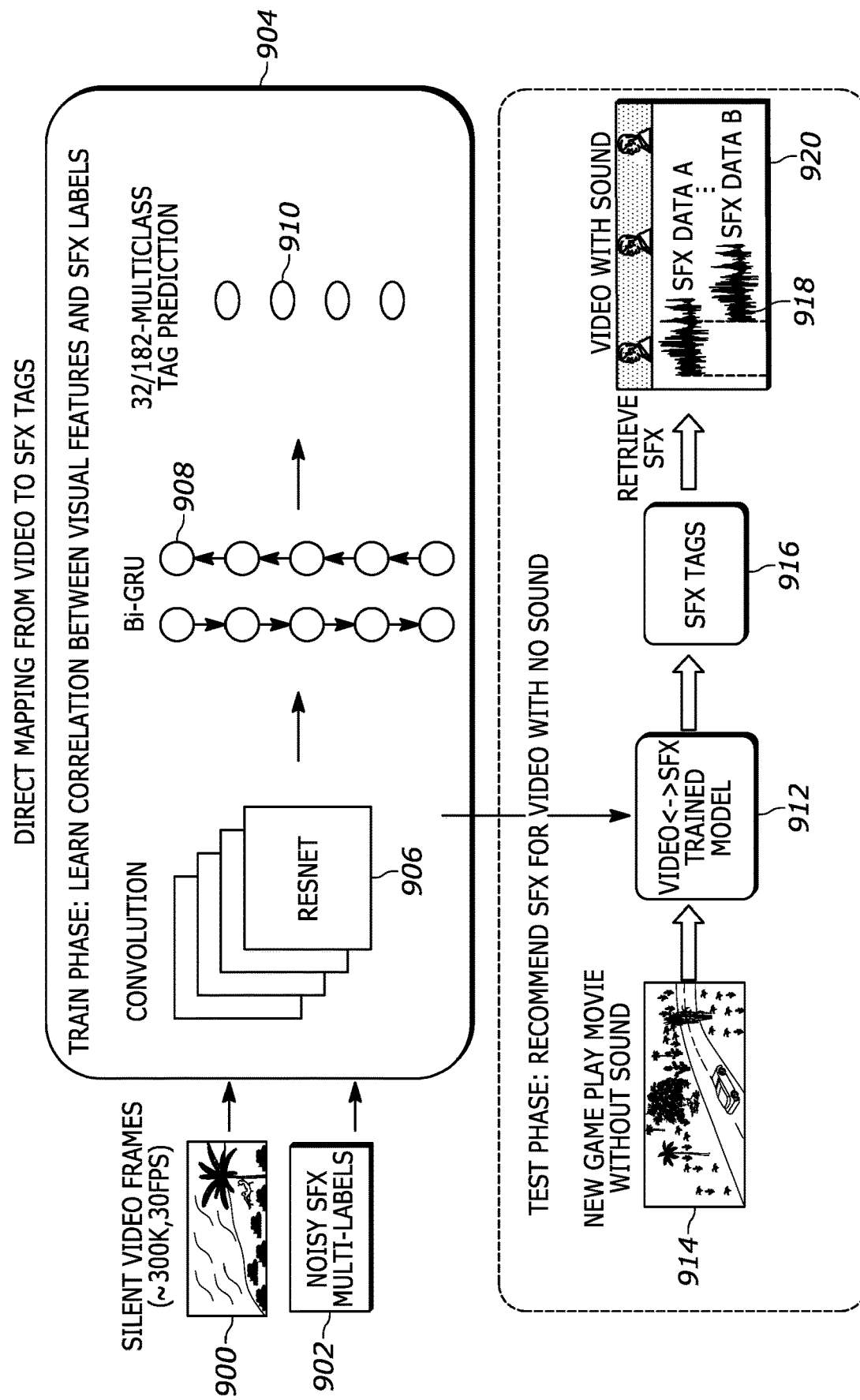
FIG. 9 is a block diagram of a machine learning architecture related to training and testing phases consistent with the first approach in FIG. 4.

Accordingly, the above description divulges a technique to identify the constituent sound effect categories of a game audio, while FIG. 9 depicts how to use these tags (generated by human or by the model in FIG. 8) to train a supervised video tagging model. As shown, during training, videos 900 with sound extracted, along with the noisy SFX tags 902 generated as described above and/or human-annotated, are input to a training phase module 904. With greater specificity, the corresponding audio that is extracted from the video is passed through the noisy SFX model explained above in FIG. 8 to generate the SFX tags or labels 902, which are input along with the corresponding video segment 900 to the supervised training phase model 904. In this way the video is synchronized with the audio tags before training. In an example non-limiting implementation, the frame rate used may be thirty frames per second (30 fps) and video duration may be one second.

The training phase module 904 generates video embeddings (numerical vectors) by passing the silent video frames through a deep CNN 906 (e.g., a Resnet or similar network). For each frame, one embedding (vector) is generated, which serves as the visual feature for the video frame. Other visual features can also be used. Because a video is a sequence of frames, a sequence of video embeddings is produced, which are then input to a recurrent neural network 908, in the example shown, a bidirectional gated recurrent unit (GRU) or gated recurrent network that produces tag predictions 910.

The output of the training is a neural model 912 that can receive new simulation video 914 without sound in a test phase and generate sound tags 916 corresponding to the silent video 914. These tags may be used to retrieve the corresponding sound effects 918 for combination with the video as shown at 920.

FIGS. 10-12 illustrate the visual understanding approach alluded to above. In a first step, video 1000 such as a computer simulation without sound (audio) is used to generate visual tags 1002 based on visual understanding of, for example, identified objects 1004 in the video, identified actions 1006 in the video, and identified scene descriptions 1008 in the video. Then a semantic text similarity module 1010 receives the visual tags 1002 along with SFX tags 1012 from the database described above to automatically map the visual tags to the specific audio categories in the sound database to generate video 1014 with sound.

FIG. 11 illustrates further. A display 1100 is shown presenting video with objects 1102 that are recognized using image recognition techniques to generate corresponding visual tags 1104. The visual tags 1104 may be embedded using word embedding or sentence embedding, which results in a numerical vector. The video tags 1104 are matched with corresponding audio tags 1106. Each audio category or audio file name that identifies an audio sample is embedded using word embedding or sentence embedding, which again results in a numerical vector. FIG. 12 similarly shows a video on a display 1200 with captions 1202 that can be matched using unsupervised semantic text similarity models 1203 to audio tags 1204.

In any case, whether matching the audio tags to object tags, caption tags, or action tags, two numerical vectors are produced, one for the audio tag and one for the tag derived from the video. The similarity of the tags is determined by computing the distance between the two vectors. Any distance measure, such as cosine similarity or Euclidean distance, can be used. The smaller the distance, the more similar the tags are. Using this approach, each visual tag is mapped to the top-k most similar audio tags.

Using this text similarity approach, each visual tag can be mapped to different granularities of audio tags, ranging from coarse grained (e.g., 32-class) tags that identify a group of audio samples to very fine-grained tags that identify an individual sound sample.

The automatically generated audio tags from visual understanding of game scenes can serve two purposes. First, the audio tags can be used to recommend sound effects for game scenes to the game designers. Second, the audio tags can also be used as SFX labels for training the direct mapping video tagging model divulged in FIGS. 4-9 as an alternative to the noisy SFX labels derived from audio.

While direct mapping in FIGS. 4-9 may provide greater accuracy in tagging than the visual understanding technique shown in FIGS. 10-12, visual understanding renders finer grained tagging using unsupervised text similarity and renders it relatively easy to annotate objects and captions. Direct mapping is particularly advantageous when accurate ground-truth SFX tags are available for tagging or sound source separation is viable. Visual understanding is particularly advantageous when obtaining fine-grained SFX annotations is otherwise difficult, and it mimics the work flow of a sound engineer.

Present principles may be used in deep learning-based methods for image, video and audio data processing, among others. As may be appreciated from the foregoing detailed description, present principles thus improve the adaptation and training of neural networks through the technological solutions described herein.

It will be appreciated that whilst present principals have been described with reference to some example embodiments, these are not intended to be limiting, and that various alternative arrangements may be used to implement the subject matter claimed herein.

What is claimed is:

1. An apparatus comprising:
at least one processor programmed with instructions to:
render classified sound effects (SFX); and
semantically match SFX labels of the classified SFX with visual labels derived from video recognition of attributes in at least a first video to incorporate, into the first video, the classified SFX associated with the SFX labels, wherein the instructions are executable to:
match SFX labels with visual labels using a computer-implemented model trained using synthesized fine-grained SFX tags and coarse-grained SFX tags obtained from actual computer simulations, the synthesized fine-grained SFX tags being generated separately from any simulation, the fine-grained SFX tags having more categories than the coarse-grained SFX tags.

2. The apparatus of claim 1, wherein the instructions are executable to:
generate the visual labels based on recognition of at least one object in the first video.

3. The apparatus of claim 1, wherein the instructions are executable to:
generate the visual labels based on recognition of at least one action in the first video.

4. The apparatus of claim 1, wherein the instructions are executable to:
generate the visual labels based on recognition of at least one caption in the first video.

5. The apparatus of claim 1, wherein the instructions are executable to semantically match SFX labels with visual labels using text similarity between the SFX labels and visual labels.

6. The apparatus of claim 1, wherein the instructions are executable to:
derive a first numerical vector corresponding to the visual labels;
derive a second numerical vector corresponding to the SFX labels; and
determine a similarity of the SFX labels to the visual labels at least in part by computing a distance between the first and second vectors.

7. The apparatus of claim 6, wherein the instructions are executable to:
determine that a first SFX label is more similar to a visual label than is a second SFX label responsive to a determination that a distance between the first vector and a second vector associated with the first SFX label is smaller than distance between the first vector and a second vector associated with the second SFX label.

8. The apparatus of claim 6, wherein the instructions are executable to:
map a single visual label to plural SFX labels.

9. A method, comprising:
generating at least one visual tag describing at least one attribute of at least a first video; and
associating with the first video at least one sound effect (SFX) associated with at least one SFX tag at least in part based on a semantic similarity between the visual tag and the SFX tag, wherein
the visual tags are associated with respective numerical visual vectors, the SFX tags are associated with respective numerical SFX vectors, and the semantic similarity is identified at least in part by computing a distance between at least one visual vector and at least one SFX vector, with a smaller distance representing a closer match between video and SFX than a larger distance, such that each visual tag is mapped to a top-k most similar SFX tags.

10. The method of claim 9, wherein the attribute comprises an object.

11. The method of claim 9, wherein the attribute comprises an action.

12. The method of claim 9, wherein the attribute comprises a caption.

13. The method of claim 9, wherein the distance comprises a cosine similarity distance.

14. The method of claim 9, wherein the distance comprises a Euclidean distance.

15. The method of claim 9, comprising:
determining that a first SFX tag is more similar to a visual tag than is a second SFX tag responsive to a determination that a distance between the first vector and a second vector associated with the first SFX tag is smaller than distance between the first vector and a second vector associated with the second SFX tag.

16. The method of claim 9, comprising:
mapping a single visual tag to plural SFX tags.

17. An assembly comprising:
at least one computer storage that is not a transitory signal and that comprises instructions executable by at least one processor for:
identifying at least one visual tag describing at least a first video; and
associating with the first video at least one sound effect (SFX) associated with at least one SFX tag at least in part based on a similarity between the visual tag and the SFX tag, wherein the visual tags are associated with respective numerical visual vectors, the SFX tags are associated with respective numerical SFX vectors, and the semantic similarity is identified at least in part by computing a distance between at least one visual vector and at least one SFX vector, with a smaller distance representing a closer match between video and SFX than a larger distance, such that each visual tag is mapped to a top-k most similar SFX tags.

18. The assembly of claim 17, comprising the processor.

19. The assembly of claim 17, wherein the instructions are executable for:
deriving a first numerical vector corresponding to the visual tag;
deriving a second numerical vector corresponding to the SFX tag; and
determining a similarity of the SFX tag to the visual tag at least in part by computing a distance between the first and second vectors.

20. The assembly of claim 19, wherein the instructions are executable for:
determining that a first SFX tag is more similar to a visual tag than is a second SFX tag responsive to a determination that a distance between the first vector and a second vector associated with the first SFX tag is smaller than distance between the first vector and a second vector associated with the second SFX tag.

* * * * *